Inventor
William R. Grams
by Leo J. (signature)
His Attorney.

Jan. 10, 1967 W. R. GRAMS 3,297,919
SOLION DEVICE HAVING HERMETICALLY SEALED
EXTERIOR OF BOROSILICATE GLASS
Filed Nov. 17, 1965
3 Sheets-Sheet 2
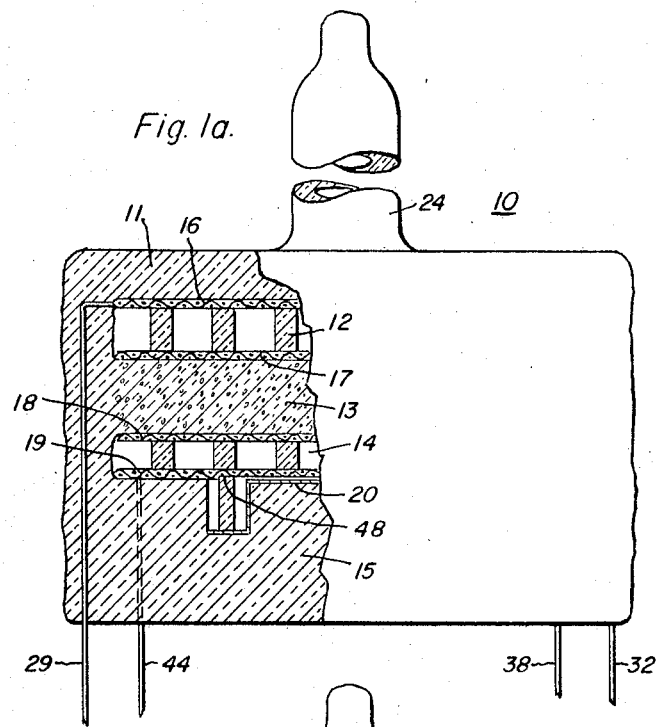
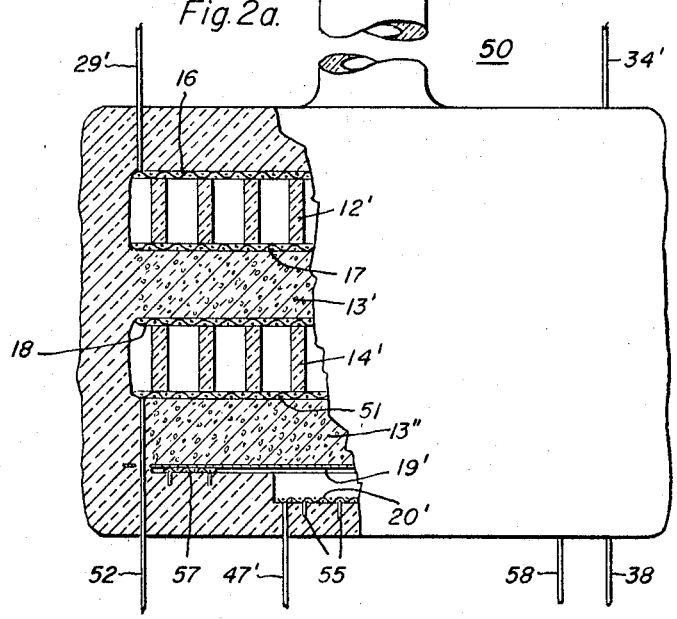
Inventor
William R. Grams
by
His Attorney.

Inventor
William R. Grams by

His Attorney.

United States Patent Office 3,297,919
Patented Jan. 10, 1967

3,297,919
SOLION DEVICE HAVING HERMETICALLY SEALED EXTERIOR OF BOROSILICATE GLASS
William R. Grams, Ballston Spa, N.Y., assignor to General Electric Company, a corporation of New York
Filed Nov. 17, 1965, Ser. No. 512,838
8 Claims. (Cl. 317—231)

This is a continuation-in-part of U.S. patent application S.N. 120,240, Grams, filed June 28, 1961, now abandoned, and assigned to the assignee of this application.

This invention relates to solion devices and more particularly to improved materials and methods of assembly of solion devices generally, and a solion integrator specifically.

A solion device is a precision electrochemical cell utilizing ions in solution as a means of carrying current, and as means to integrate, store and deliver electrical signals. Such a device is usually housed in a suitable envelope or enclosure to contain small electrodes and a chemical solution of, for example, potassium iodide and iodine which are dissolved in a solvent. At the surface of the electrodes in the electrolyte solution, the mechanism of conduction changes from ionic to electronic. This change is accomplished by an electrochemical reaction at the interface of the electrodes where the valences of ions are changed. At the anode, ions lose electrons or are oxidized, and at the cathode they gain electrons or are reduced. Various electrochemical reactions can take place at the surface between an electrolyte and an electrode. In the solion units discussed, the electrodes and the electrolyte are so chosen that the electrodes do not enter into the electrochemical reaction and merely serve as a conductive surface at which electrons may be interchanged with the external circuit. In addition, the electrolyte contains both the oxidized and the reduced species of the ion, for example, iodine and iodide. Solion devices may be employed in a great many applications, for example, as measuring devices, amplifiers, diodes, integrators, multipliers, current regulators, low voltage standard devices, and various other devices. As an integrator, a solion accepts an electrical signal and provides a read out of the time integral of the signal as output current.

Great care must be taken in the selection of materials and their use in solion devices because even minute amounts of contaminants upset solion electrode reactions. Because of the definite chemical inertness required, care must also be taken in the choice of metals for the electrodes and also of the internal parts, and usually only those metals of the platinum family, for example, platinum and its noble metal alloys are considered. Since it is preferable to construct solion devices in the form of tubes, which may be plugged into an existing circuit, a housing, or envelope, is required for the device. Ordinarily it would be preferred to select for the construction of such housing a material, which is closely matched in expansion characteristics to the platinum electrodes employed. This matching of expansion characteristics has heretofore been necessary not only for sealing but also because in these devices clearances, spacings and alignments are critical and must be maintained precisely in various environments and under differing operating conditions. This has resulted in the use as well as of various envelope materials, i.e. plastics, which are generally undesirable for long term and efficient operation because the chemical solution employed in solion devices reacts with the envelope material leaching unwanted impurities therefrom into the solion devices. Manufacture of solions using plastic envelopes is possible in spite of mismatch with the electrode material, because of the relatively small temperature differential to which the unit would be exposed during manufacture.

Accordingly, it is an object of this invention to provide an improved solion device.

It is another object of this invention to provide a solion device structure which may be plugged into existing circuits.

It is a further object of this invention to provide for the use of borosilicate glass in conjunction with platinum electrodes in the construction of solion devices.

It is yet another object of this invention to provide a solion device of a smaller volume with all electrical leads located at one end.

It is still another object of this invention to provide an improved method of assembly of solion devices.

It is still a further object of this invention to provide a solion device wherein critical spacings are preserved.

Briefly described, this invention in one form comprises utilizing and stacking in aligned parallel relationship a plurality of borosilicate glass spacers and porous borosilicate glass frit members with intermediate platinum electrodes, which, after assembly in stacked relation, are sealed to provide a hermetically sealed chamber or unit.

Unless otherwise indicated the term "glass" is intended to mean "borosilicate glass."

This invention will be best understood when taken in connection with the following description and the drawings in which:

FIG. 1a is a view partially in cross-section showing the embodiment of FIG. 1 in the assembled state;

FIG. 2a is a view partially in cross-section showing the embodiment of FIG. 2 in the assembled state.

Figure 1:
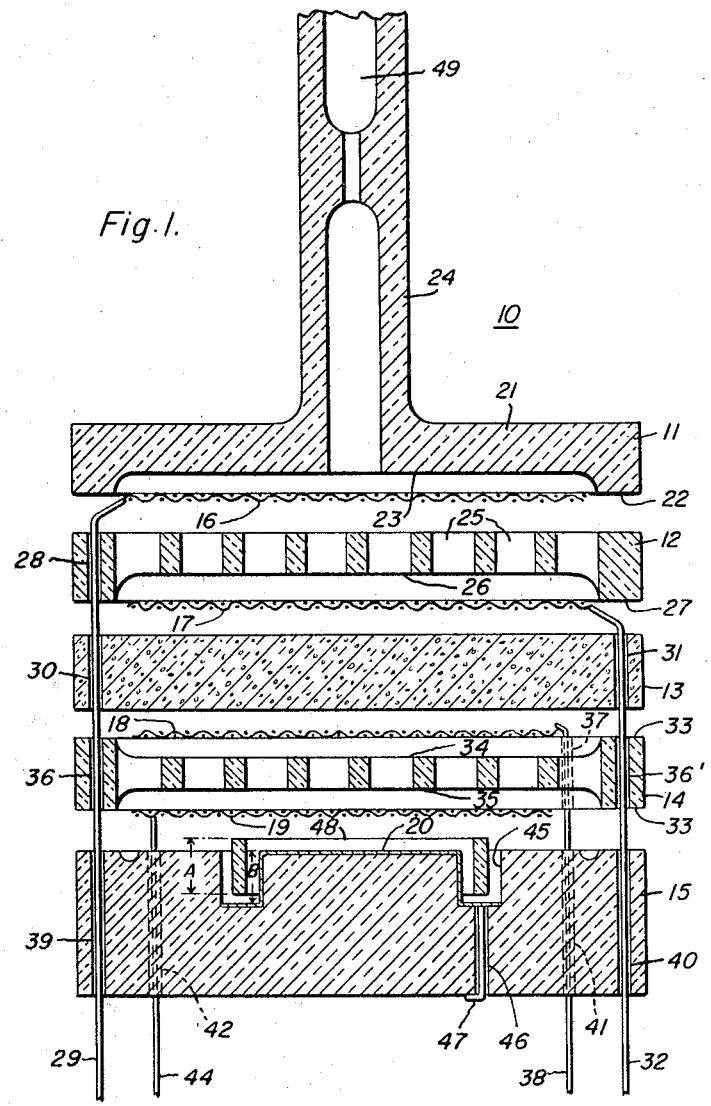
FIG. 1 is an exploded view of one embodiment of this invention.

Referring now to FIG. 1, there is shown in exploded view, a solion device 10 employed as an integrator. This solion integrator 10 includes a plurality of glass parts 11, 12, 13 14 and 15, as concentrically positioned disk-like elements, and a plurality of platinum electrodes 16, 17, 18, 19 and 20. Borosilicate glass is a chemically inert, heat resistant glass having a coefficient of thermal expansion of about $3.2 \times 10^{-6}$. The configuration and arrangement of the parts of this invention permit the use of this glass of low thermal expansion in combination with, metals, e.g. platinum, having considerably greater coefficients of thermal expansion. Borosilicate glasses manufactured by Corning Glass Works are marketed under the name of Pyrex and are described in the publication "This Is Glass" (copyright 1956, Corning Glass Works, Library of Congress Catalog No. 56–12659). Additional description of Pyrex glass as borosilicate glass may be found in the "Encyclopedia of Chemical Technology," by Kirk and Othmer (vol. 7, p. 183, Interscience Publishers, Inc., 1951). Pyrex glasses provide a long-life solion device without introduction of impurities to affect the operating characteristics of the solion device, and at the same time, these glasses in the particular arrangement illustrated minimize mismatch effects. A preferred Pyrex glass is commercially available as 7740 Pyrex glass. Glass part 11 serves as an impervious closure or end member which includes a base or shoulder 21 and a circumferential rim 22 which defines a dished under surface 23. A hollow glass stem 24 projects from the shoulder 21 to provide means for filling and sealing a solion device as hereinafter described, and to provide an expansion space.

Glass disk element 12 is a perforated spacer element having a plurality of relatively large openings 25 therein and a dished under surface 26 formed by lower projecting rim 27. A platinum gauze, screen, or mesh, input electrode 16, in one example 80 mesh, is positioned between the spacer 12 and closure 11, which may be considered a "set" of disks having their major surfaces parallel to each other. Electrode 16 is an input cathode and separation anode as will hereinafter be described with relation to overall operation. In order to provide an external electrical connection to electrode 16, a suitable passage or opening 28 is provided in rim 27 through which electrical lead 29 connected to electrode 16 is passed during assembly.

Next adjacent spacer element 12 is another and similar platinum mesh separation anode electrode 17 located between the set of disks consisting of spacer element 12 and the porous glass frit separator 13. Separator 13 is a sintered, porous glass frit disk member and includes an opening 30 to provide for the passage therethrough of aforementioned lead 29, and a further opening 31 to provide passage therethrough of electrical lead 32 connected to electrode 17. Glass frit member 13 is employed to minimize the passage of solution therethrough and the particle size is generally in the range of .8 to 1.4 microns, .8 micron particle size being preferred. A further platinum mesh electrode, separation cathode 18, is positioned adjacent and between the set of disks consisting of the separator element 13 and glass spacer element 14. Spacer element 14 is similar to spacer element 12 and is provided with a rim 33 which defines upper and lower dished surfaces 34 and 35, respectively. An opening 36 in rim 33 is provided for assembly to permit passage of lead 29 therethrough. A further opening 36' is provided in rim 33 to permit passage of electrical lead 32 therethrough. An additional opening 37 in rim 33 permits passage of a further lead 38 to be electrically connected to electrode 18. Preferably all electrode leads used in the practice of this invention are of platinum or of other metal suitable for solion electrode construction.

Spacer member 14 is followed by a platinum mesh integrator output cathode electrode 19 and a glass base member 15. Glass base member 15 is positioned next adjacent electrode 19 and includes openings 39, 40, 41 and 42 through which electrical leads 29, 32, 38 and 44 are passed during assembly to provide electrical connections to electrode 16, 17, 18 and 19, respectively. Base member 15 also includes an annular depression 45 in which there is positioned a solid or impervious cup-shaped platinum integrator input electrode 20. Integrator electrode 20 is provided with external connection via opening 46 by means of platinum foil lead 47 therein. A predetermined spacing is provided between electrode 20 and electrode 19 by means of annular spacer 48, which, for example, may be of glass, quartz or similar material and is positioned in annular groove 45.

One of the novel features of this invention is shown in the final assembly (FIG. 1a) of the exploded arrangement of FIG. 1. In assembly the electrically insulating disks, electrodes and the spacer 48 are stacked as illustrated and placed under axial compression. Thereafter, peripheral surface of the assembly is heated to the softening point of the glass. During this treatment, the rims 22, 27 and 33 on glass elements 11, 12, and 14, respectively, are diminished in height so that the electrodes 16, 17 and 18 becomes disposed flat against adjacent glass surfaces on each side thereof. The excess glass being soft is forced to the side as shown. If desired, these accumulations of glass can be smoothed out and distributed. At the same time, the spacer element 48 determines a predetermined critical spacing (dimension A is greater than dimension B) between electrodes 20 and 19. For most solion integrator applications this electrode spacing may range from about 0.001 to about 0.002 inch. In other integrator applications special conditions have to be met, thus for a very short time response a spacing of as little as about 0.0005 inch may be required, while for greater integrating capacity a spacing of as much as 0.004 inch may be used. In solion constructions, e.g. solion diodes, wherein the integrating function is not conducted, the same problems of corrosion and the presence of impurities (as is engendered by leaching) exist and the materials of this invention are advantageously employed in construction thereof, however, the anode-cathode spacing therein may range from about 0.02 to about 0.04 inch.

The aforementioned heating of the whole assembly enables flame-sealing of the exterior surface thereof to provide a vacuum-tight housing. The assembled device 10 is then filled through stem 24 with a suitable chemical solution, such as for example, potassium iodide and iodine, and sealed off to leave an expansion space 49. What is therefore provided, is a very small volume solion device employing borosilicate glass in combination with platinum electrodes and with electrical leads brought out at one end. The structure is very firm, operative over long periods of time without leaching of impurities from the glass and highly resistant to mismatch effects.

As described, expansion mismatch may become a critical feature. More particularly, this critical feature exists between electrodes 19 and 20. The problem of metal-glass mismatch is described in detail in the textbook "Glass-to-Metal Seals," by J. H. Partridge (The Society of Glass Technology, Sheffield, England, 1949, pp. 6, 7, 48, 50, 53). Even in very small sizes, for example, where the solion device of FIG. 1 is of a ⅛ inch diameter, during heating the expansion mismatch may cause the platinum mesh electrode 19 to curve outwardly towards electrode 20 and deform, which deformation remains after cooling of the assembly from fabricating temperatures. Similarly the differential expansion may be of concern under various operating temperature conditions in different environments. This becomes more clearly evident when it it atempted to manufacture solion devices in larger sizes. In this connection, more particular care must be given to the sealing of the electrode leads, for example 29 and 32, which extend through the assembly through, in effect, two different concentrations of solutions, i. e., that above separator 13 and that below separator 13 before the onset of current integration; or three different concentrations during the integration function. It is obvious that if the electrolyte solution contacts these electrode leads below separator 13 that the solion device may therefore become inoperative since different voltages and ion concentrations are present. This problem is solved by hermetically isolating the leads, more fully described below.

Figure 2:
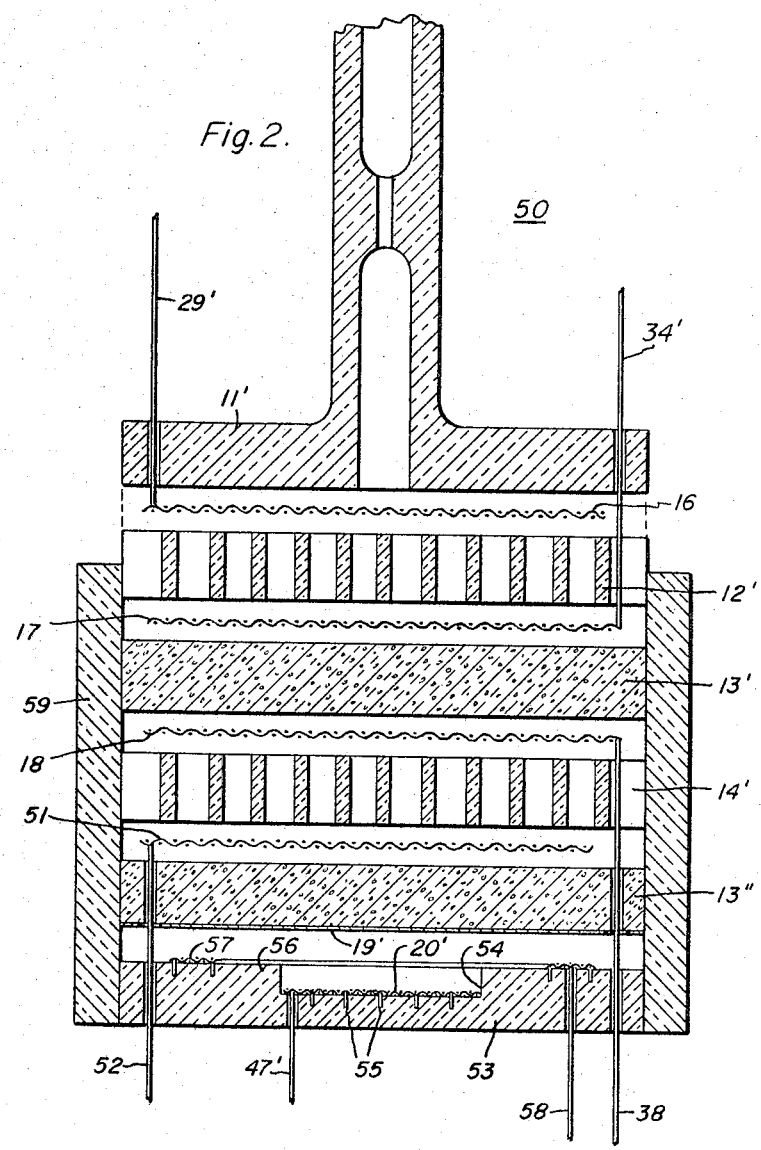
FIG. 2 is an exploded view of a preferred modification of this invention.

In FIG. 2 there is illustrated a modified, improved and preferred form of this invention. The various parts of solion 50 are quite similar to those of FIG. 1, and are shown separated for clarity of illustration. Assembly, also, is accomplished in a similar manner. In FIG. 2 top closure member 11' is similar to part 11 of FIG. 1, however without a rim 22. Next adjacent closure member 11' is an input cathode electrode 16 having an electrical lead 29' attached thereto and brought outside the assembly through a suitable aperture in closure 11'. Next adjacent input electrode 16 is a separator member 12' similar to separator 12 of FIG. 1, and a separation anode electrode 17. Closure member 11' and separator member 12' thus compose a set of disks having electrode 16 therebetween. An electrical lead 34' is connected to electrode 17 and brought out of the assembly through suitable apertures in separator 12' and closure 11'. Leads 29' and 34' are brought out of the assembly through closure 11' in order that they do not pass through different concentrations of electrolyte in the top and bottom portion of the assembly as will be understood in connection with an operation of the device to be hereinafter described. Next adjacent electrode 17 is a porous frit member 13', similar to frit 13 of FIG. 1, and a separation cathode electrode 18. A separator member 14' similar to separator 14 of FIG. 1 is positioned adjacent electrode 18 and includes a suitable opening therein so that lead 38 may be connected to electrode 18 to be brought out of the assembly. A reset electrode 51 is placed adjacent separator 14' and followed by an additional porous frit member 13''. Frit member 13'' also is provided with a pair of suitable openings so that lead 38 may pass therethrough to cathode 18 and a further lead 52 may pass therethrough for connection to electrode 51.

The integrator portion of the solion comprises output cathode electrode 19' and input and output anode electrode 20' with electrode 19' being positioned against frit 13'' and electrode 20' being affixed to base member 53. Electrode 19' must, of course, be porous and may be prepared either by pressing platinum gauze between platens to achieve a desired fineness of porosity or by vapor depositing or sputtering platinum on the frit member 13'' to a controlled thickness. Base member 53 includes a depression 54 therein which determines the spacing between electrode 20', to be positioned at the bottom surface thereof, and electrode 19'. Electrode 20' to be placed in this depression is platinum gauze of about 80 mesh, and has small short ribs 55 of platinum welded to it at intervals all over electrode 20' and extending into glass base 53, for anchoring purposes. Contrary to what might have been expected in the preparation of solions employing this mode of anchoring, cracks did not develop in base 53. Poistioned concentrically with and surrounding electrode 20' and on shoulder 56, there is a ring 57 of platinum mesh which, in assembly (FIG. 2a), contacts electrode 19' and is similarly anchored with short ribs. Thereafter lead 58 brings out the electrical connection for electrode 19'. Suitable apertures are provided in base member 53 so that leads 38, 58 and 52 may pass therethrough. Lead 47' brings out the connection for anode 20'.

The mode of assembly of the solion device 50 follows that employed with the assembly of the solion of FIG. 1. All described and illustrated parts are placed in position as illustrated in FIG. 2a within the surrounding sleeve or tube 59 of glass. The assembly is then heated so that fusing occurs at the ends of sleeve 59 between closure 11' and sleeve 59 and between base 53 and sleeve 59. Heating proceeds until the glass fuses around all leads closing the apertures therearound and fusing sleeve 59 to the remaining disks. Electrode 19' is notched where leads 38 and 52 pass therethrough so that fused glass from the closely spaced elements 13'', 53 merge to surround leads 38, 52 whereby they are hermetically sealed from contact with the electrolyte in the integrator chamber. All leads in the same circumstances are so sealed. In this manner short-circuiting by leads is prevented and the hermetic sealing isolate these leads electrolytically. After the ends or top and bottom portion have been sealed, the central portion of the device is heated while the internal volume is under vacuum. A unitary, compact, hermetically sealed solion with minimal mismatch effect is provided.

The integrator portion of the solion device is considered the most sensitive part. This part consists of electrode 19' and 20' and their supporting members. Separation of electrodes 19' and 20' is critical and their proper alignment in the assembly causes the greatest of difficulties. The provision of depression 54 in the integrator base or block 53 minimizes mismatch and spacing problems caused by the use of borosilicate glass by enabling the maintenance or predetermination of the integrator electrode spacings. Depression 54 may be formed in various ways including molding and finishing to exact depth. Thereafter, electrode 20' and ring 57 are attached. Preferably, however, the assembly and manufacture is carried out by a plunger and die assembly which simultaneously molds base 53 while pressing electrode 20' and ring 57 and supports 55 in place. A preferred form of an integrator portion includes a sputtered layer of platinum instead of gauze as electrodes, particularly 19' for further minimal mismatch. Platinum is sputtered on frit 13'' to about 0.0005 inch thickness to provide about a 1-ohm resistance between its center and periphery. It is quite obvious that sputtering provides a platinum electrode which is securely attached to the frit 13'' along its entire surface. By this means, expansion mismatch does not cause bulging of the electrode away from the glass element.

Figure 3:
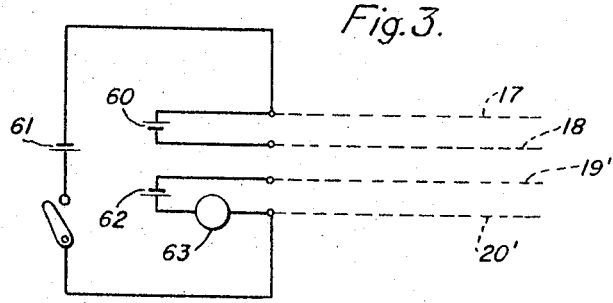
FIG. 3 is a simplified circuit of a four-electrode solion.

Operation of either device, FIG. 1 or FIG. 2, is best described in conjunction with the schematic circuitry of FIG. 3 with an aqueous electrolytic solution of potassium iodide and iodine present. In one example this solution contains KI and $I_2$ in the ratio of 200:1 (2 N KI, 0.01 N $I_2$). The number of electrodes employed is not germane to this invention. FIG. 1 illustrates five electrodes, and FIG. 2, six electrodes. In FIG. 1, input cathode 16 may be combined with separation anode 17 as one dual purpose electrode. The same is true for FIG. 2. Furthermore, additional electrodes may be employed, such as reset electrode 51 (FIG. 2). Basically, however, four electrodes suffice for a description of the operation of this invention in relation to FIG. 3.

Referring to FIG. 3, four electrodes are illustrated as, first, combined input cathode separation anode 17, second, intermediate poruos separation cathode 18, third, intermediate porous integrator cathode 19', and fourth, integrator input and output anode 20'. Electrodes 17 and 18 are connected to a suitable source of power such as battery 60 as anode and cathode, respectively. Iodine is thus reduced at electrode 18 to iodide and iodide is oxidized to iodine at electrode 17. Thus separation of iodide below electrode 18 and iodine and iodide above above electrode 18 occurs. A quicker method of accomplishing separation would be to connect electrodes 18, 19' and 20' to the negative side of a battery and electrode 17 to the positive side so that for each iodine ion being reduced to iodide at electrodes 18, 19' and 20' an iodine ion appears at electrode 17. Electrode 17 is connected to the negative side of a battery 61 and electrode 20' to the positive side. Iodide is then oxidized to iodine at electrode 20' and iodine is reduced to iodide at electrode 17. The change of iodine concentration at the electrode 20' is a function of current flow according to Faraday's Law. A measure of the integral of this current is provided by connecting the positive side of a battery 62 to electrode 20' and the negative side to electrode 19' with an ammeter 63 in the line. Because free iodine concentration increases in the integrator chamber during the redox process, the change is indicated by the ammeter as an output current proportional to the integral value of the input current. It is, of course, understood that the circuit described is merely exemplary and that various modifications may be employed although the process as described with four electrodes remains essentially the same. Input to the solion is described with respect to battery 61 as an example only since this input is from a power source or signal source generally.

As may be seen from the above explanation it is most important that ions passing from one chamber to another shall contact electrode surfaces interposed therebetween for necessary electrical modification. For this reason it is of particular advantage to construct the disks interposed between electrodes out of borosilicate glass. In this way a hermetic seal is possible, as shown in FIG. 2a, between the borosilicate envelope and disks 13' and 13''. However, if other means are possible to prevent or offset short-circuiting between separate compartments, the spacers, or disks, may be made of other electrically non-conducting, non-leachable materials, for example, porous alumina.

It can thus be understood that the teachings of this invention provide an advantageous assembly construction and method whereby provision is made for the use of highly desirable non-contaminating low expansion glass in combination with platinum electrodes minimizing sealing and mismatch problems together with providing optimum electrical lead positioning. Comparative operational results are more favorable than in the known construction employing plastic housings.

While a specific method and apparatus in accordance with this invention has been shown and described, it is not intended that the invention be limited to the particular description nor to the particular configurations illustrated, and it is intended by the appended claims to cover all modifications within the spirit and scope of this invention.

What I claim as new and desire to secure by Letters Patent of the United States is:

1. In an electrochemical device utilizing ions in a reversible redox system for the conduction of electric current, said device comprising in combination:
   (a) a fused hermetically sealed borosilicate glass envelope containing a redox system electrolyte,
   (b) a plurality of disks of electrically non-conducting non-leachable material arranged in said envelope in aligned parallel relationship,
   (c) a plurality of porous electrode means fixedly located in said envelope in electronic isolation from each other in contact with said electrolyte and made of metal selected from the group comprising platinum, palladium, iridium, ruthenium and rhodium and alloys thereof, and
   (d) lead means electronically and electrolytically isolated from each other within said device for providing a separate electronic connection to each of said electrodes from outside said device,
      (1) said envelope having a first inner flat surface at one end thereof substantially parallel to a second inner flat surface at the other end thereof and to the major surfaces of said disks, and
      (2) said electrode means being arranged fixedly spaced from and electronically isolated from each other with surface area of at least one electrode being located between each set of adjacent opposed stacked disks and at least two of said electrodes having a substantially uniform spacing between the major surfaces thereof of between about 0.0005 and about 0.004 inch.

2. The electrochemical device substantially as recited are made of borosilicate frit.

3. The electrochemical device substantially as recited in claim 1 wherein there is provided additional means for spacing apart the electrodes spaced about 0.0005 to about 0.004 inch apart.

4. The electrochemical device substantially as recited in claim 1 wherein one of the electrolytically connected electrodes is located in a recess in the first inner flat surface and is affixed to the one end with short metal ribs embedded in the borosilicate glass.

5. The electrochemical device substantially as recited in claim 1 wherein all lead means pass to the outside of the envelope through the same end thereof.

6. An electrochemical device utilizing ions in a reversible redox system for the conduction of electric current, said device comprising in combination:
   (a) a plurality of disks of borosilicate glass in aligned parallel stacked arrangement,
   (b) a plurality of porous electrodes fixedly located electronically isolated from each other and formed of metal selected from the group comprising platinum, palladium, iridium, ruthenium and rhodium and alloys thereof,
      (1) said electrodes being disposed with at least one electrode being disposed between every set of adjacent disks with at least two of said electrodes having a substantially uniform spacing therebetween of between about 0.0005 and about 0.004 inch and
   (c) lead means for providing a separate electronic connection to each of said electrodes from outside said device,
      (1) said lead means being electronically and electrolytically isolated from each other within said device, and
      (2) the periphery of adjacent disks being fused together into a hermetically sealed borosilicate glass outer surface containing a redox system electrolyte and with said disks and electrodes therein in fixed position relative to each other, said electrodes being in contact with said electrolyte.

7. The electrochemical device substantially as recited in claim 6 wherein all lead means penetrate the outer surface at the same end of said device.

8. The electrochemical device substantially as recited in claim 6 wherein there is provided additional means for spacing apart the electrodes spaced about 0.0005 to about 0.004 inch apart.

References Cited by the Examiner
UNITED STATES PATENTS

| | | | |
|---|---|---|---|
| 2,644,901 | 7/1953 | Hardway | 317—231 |
| 2,644,902 | 7/1953 | Hardway | 317—231 |
| 2,685,025 | 7/1954 | Root | 317—231 |

OTHER REFERENCES
Journal of the Electrochemical Society, vol. 104, No. 12, pp. 727–730. An article by Ray M. Hurd and R. N. Lane entitled: "Principles of Very Low Power Electrochemical Control Devices."

References Cited by the Applicant
UNITED STATES PATENTS

| | | |
|---|---|---|
| 2,225,465 | 12/1940 | Scharfnagel. |
| 2,661,430 | 12/1953 | Hardway. |
| 2,685,025 | 7/1954 | Root. |
| 2,695,442 | 11/1954 | Klopping. |
| 3,021,482 | 2/1962 | Estes. |
| 3,050,665 | 8/1962 | Hurd. |
| 3,052,830 | 9/1962 | Ovshinsky. |
| 3,163,806 | 12/1964 | Estes et al. |

OTHER REFERENCES
Publication: "Solions," in Encyclopedia of Chemical Technology," by Kirk and Othmer, 2nd Supplement (1960), pp. 753–763.

JAMES D. KALLAM, *Primary Examiner.*